United States Patent Office 2,871,629
Patented Feb. 3, 1959

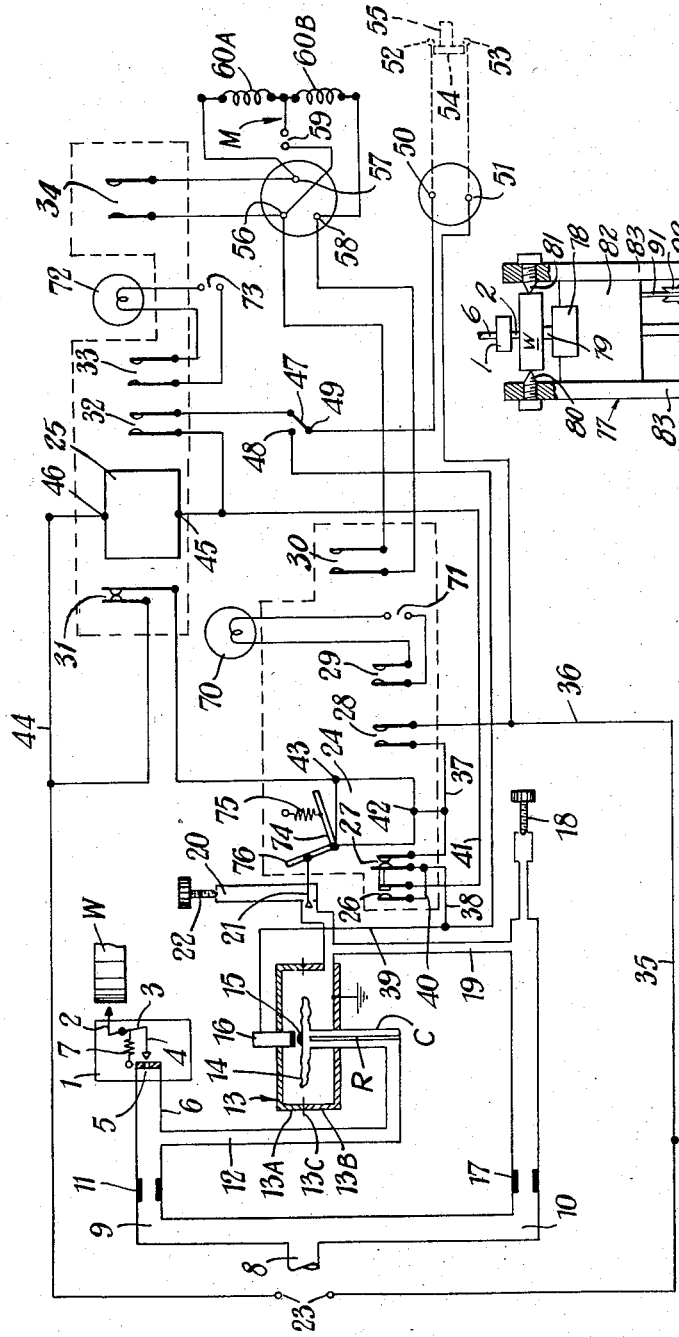
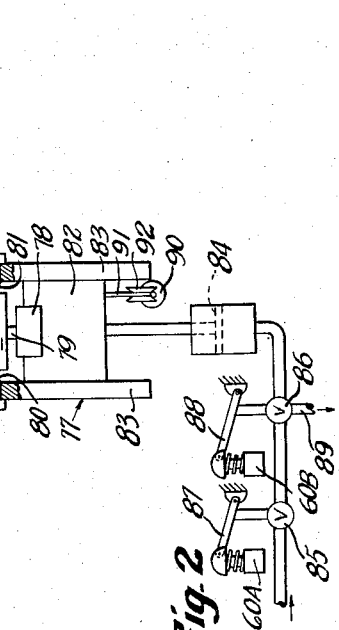
Fig. 1
Fig. 2

2,871,629

APPARATUS FOR CONTROLLING A MACHINE TOOL IN RESPONSE TO DIMENSIONAL CHANGES OF A WORKPIECE

Frederick Robert Boosey, Letchworth, England, assignor to The Sigma Instrument Company Limited, Letchworth, England, a British company Application December 7, 1954, Serial No. 473,704

Claims priority, application Great Britain June 4, 1954

6 Claims. (Cl. 51—165)

This invention relates to apparatus for controlling a machine tool in response to dimensional changes of a workpiece that is being treated by the machine tool.

The invention is broadly applicable to machine tools that can be set up for operating at a given rate or rates upon a workpiece, such as, for example, a grinding machine.

In accordance with the invention there is provided a control apparatus comprising means responsive to dimensional changes of a workpiece undergoing treatment in a machine tool for correspondingly varying the pneumatic pressure in a pneumatic pressure responsive element, an electric switch device operable by said element, and means for initiating a controlling signal to the machine tool when said switch device is operated by said element, thereby to vary the action of the machine on the workpiece.

The invention is particularly applicable for the controlling of a machine in which there are successive stages of treatment of the workpiece. The said switch device may be arranged to initiate a signal at the end of a first stage of treatment as signified by the dimensionally responsive means and consequently by said responsive element, and said signal may serve to vary the conditions for the response of said responsive element, whereby such signal can also initiate a second stage the end of which would be signified by another operation of said switch device for the purpose of producing another signal for concluding the second stage operation of the machine tool. If desired there may be more than two successive stages.

For a better understanding of the invention and to show how the same may be carried into effect, reference will now be made to the accompanying drawing in which:

Fig. 1 is a diagram of a control device provided in accordance with the invention; and Fig. 2 illustrates the operative connection between the control device and a machine tool.

For the purposes of this description, it will be supposed that the control apparatus is applied to a conventional precision grinding machine. The grinding machine is shown in Fig. 2, but there is simply a workpiece indicated at W in Fig. 1. It will be supposed that the workpiece W has to be ground so as to have a particular outside diameter (although it will be understood that instead of an outside diameter, an inside diameter, or a thickness could be concerned, depending upon the type of machine and the character of the workpiece). The grinding has to take place in two stages there being a first stage where the workpiece is brought to approximately the correct external diameter whereupon a second stage is commenced in order to bring the workpiece to the required diameter by a more gradual grinding process.

There is mounted near to the workpiece a pneumatic gauge 1 which may take any one of several known forms. For the purpose of illustration, it is assumed that the pneumatic gauge 1 has a stylus head 2 for contacting the work W, the movements of the stylus being transferred through a reversing lever 3 to a needle valve 4 co-operating with an orifice 5 located at one end of a tube 6. In a manner that will be explained hereinafter, the tube 6 is connected with an air supply, the air escaping from the orifice 5 in dependence upon the position of the needle valve 4 in relation to the orifice 5. A spring 7 tends to urge the needle valve 4 to the closed position thereby maintaining the stylus 2 on the diameter of the work W that is to be gauged. It will be realised that when the workpiece W is over-size the needle valve 4 is relatively remote from its orifice 5 but approaches such orifice as the work is reduced towards the correct diameter.

The control apparatus has a constant pressure air supply pipe 8 having branches 9 and 10. In the branch 9 there is located a constriction 11, such branch extending beyond the constriction 11 to the tube 6 of the gauge 1. On the downstream side of the constriction 11, the branch 9 has a pipe 12 connected thereto, the pipe extending within a closed chamber 13 and having the end thereof opening into a flexible capsule 14. The chamber 13 is made of electrically conducting material, as also the capsule 14, but the chamber is in two parts, the upper part 13A being united with the lower part 13B through an electrically insulating jointing medium 13C. The capsule supports an electrical contact 15 for co-operation with a fixed electrical contact 16 secured in the wall of the upper part 13A of the chamber 13. The contact 15 is in electrical connection with the lower part 13B of the chamber 13 which is grounded.

The branch 10 has a constriction 17, on the downstream side of which there is an adjustable escape valve 18. Between the constriction 17 and the valve 18 a pipe 19 is connected, such pipe communicating with the interior of the chamber 13. The pipe 19 communicates also with a tube 20 through a valve 21. The tube 20 is provided with an adjustable escape valve 22.

The control device has electrical input terminals 23 for supplying relay windings 24 and 25. The relay winding 24 controls five pairs of contacts 26, 27, 28, 29 and 30, all of which are normally open except the contacts 27. It does, of course, follow that when the relay winding 24 is energised, all the contacts close except the contacts 27 which open. The relay winding 25 has contacts 31, 32, 33 and 34, all of which are normally open except the contacts 31 which are normally closed. One side of the input terminals 23 is joined by a grounded line 35, which is connected by a lead 36 to one of the contacts 28. The other of the contacts 28 is connected by a lead 37 to one of the contacts 27. The other of the contacts 27 has a connection 38 which joins a lead 39 extending from the contact 16 associated with the chamber 13. The connection 38 is joined to a further connection 40 which extends to one contact of the pair 26, the other contact of this pair being connected to a lead 41.

The relay winding 24 has terminals 42 and 43. The terminal 42 is joined to the lead 37, while the terminal 43 is connected to one of the contacts 31, the other of which is connected to a line 44 extending from the ungrounded side of the supply terminals 23.

The relay winding 25 has terminals 45 and 46, the terminal 45 being joined by the lead 41. The latter is also connected to one contact of the pair 32, the other contact of such pair being connected to a switch arm 47 having two switch contacts 48 and 49. The switch contact 48 is connected with the lead 39, whereas the switch contact 49 is connected to a terminal 50 adjacent to a second terminal 51 connected to the grounded line 35. From the terminals 50 and 51, two leads extend to a push-button switch located on the machine that is to be controlled. The push-button switch essentially comprises poles 52 and 53 normally bridged by a contact piece 54 which can be displaced from its bridging position with the aid of the push-button 55.

There are three terminals 56, 57 and 58, the pair 56 and 58 of which is connected to the contacts 30 while the pair 56 and 57 is connected to the contacts 34. The three terminals are connected by a three-way cable to the machine M that is to be controlled. The machine has input terminals 59 for connection to an electric supply source, one of the terminals 59 being connected through an electromagnet 60A to the terminal 57 and through an electromagnet 60B to the terminal 58. The other terminal 59 is connected to the terminal 56. Energisation of the electromagnet 60B causes the machine M to operate in one particular way and energisation of the electromagnet 60A causes the machine to operate in another particular way.

The contacts 29 are included in a circuit comprising a warning lamp 70 and input supply terminals 71. The contacts 33 are similarly included in a circuit having a warning lamp 72 and input terminals 73. It will be understood that when the relay winding 25 is energised, this is indicated by the warning light 72 which then glows. In a similar manner, when the relay winding 24 is energised the contacts 29 close and the warning light 70 indicates the situation. It has also to be remarked that when the relay winding 24 is energised, an armature 74 is swung against the action of a retaining spring 75, in a clockwise direction. The armature 74 causes a lever 76 to be correspondingly swung, such lever being pivotally attached to the valve 21.

For an understanding of the operation of the apparatus so far described, it will be supposed that a machine for operating upon a workpiece W is set up with the workpiece W in position. The workpiece W has to be reduced in a first stage by a relatively coarse operation until the external diameter approaches a desired preliminary size. Thereafter it is required that the operation on the workpiece shall proceed by a finer reduction in diameter in a second stage until the required finished diameter is reached. The arrangement at the machine is such that when the electromagnets 60A and 60B are on open circuit and when the machine itself is switched on, the first stage of operations on the workpeice proceeds. The gauge 1 has its stylus 2 in contact with the workpiece, and while the latter is coarsely reduced the gauge continuously responds to the reduction. At an instant when the first stage should finish, the gauge 1 initiates an action whereby the previously open circuit to the terminals 56 and 58 is closed, whereupon the electromagnet 60B associated with these terminals operates and causes the machine automatically to change its setting and to commence the second stage operation. The gauge 1 continues to respond to the finer reduction of the workpiece during the second stage until the finished size is obtained, whereupon the gauge causes the terminals 56 and 57 to have a circuit closed between them. The electromagnet 60A associated with the terminals 56, 57 then operates and effectively terminates the second stage operation of the machine. In the illustrated position of the switch arm 47, the push-button 55 on the machine is operative. If the finished workpiece is now removed from the machine and another workpiece inserted (thereby restoring gauge 1 to its initial position), then when the push-button is pressed, the apparatus is caused to resume an initial position where both the electromagnets 60A and 60B are open circuited and a fresh operation may be commenced. If the switch arm 47 is in its other position where it co-operates with the contact 48, then when the second stage is completed and another workpiece automatically inserted the apparatus will automatically be re-set to commence once more the first stage, and the apparatus will continue to carry out the first and second stages cyclically.

Having explained the overall operation of the control apparatus in relation to the associated machine, a detailed description of the operation of the control apparatus itself will now be given.

A supply of constant pressure air is connected to the pipe 8. Because of the constriction 11, the pressure on the downstream side of the constriction will vary according to the setting of the needle valve 4 in relation to its orifice 5. At the commencement of the first stage, the needle valve 4 will be relatively remote from the orifice 5 and hence the pressure on the downstream side of the constriction will be relatively low. This low pressure is communicated through the pipe 12 to the interior of the flexible capsule 14. Both the escape valves 18 and 22 will meanwhile be permitting escape of air on the downstream side of the constriction 17 in the other branch 10. The pressure in the chamber 13 surrounding the capsule 14, will depend upon the adjustment of the valves 18 and 22. At the beginning of the first stage, the pressure in the chamber 13 will be greater than that in the capsule 14 and hence the capsule 14 will remain collapsed. As the first stage proceeds, the needle valve 4 of the gauge 1 will approach its orifice 5 and will restrict the escape of air. Hence the pressure on the downstream side of the orifice 11 will rise and the capsule 14 will correspondingly be subjected to greater internal pressure. At a particular gauging response of the needle valve 4, corresponding to a particular predetermined reduced diameter of the workpiece W, the pressure in the capsule 14 will rise to the point where the electrical contact 15 thereon encounters the contact 16 as the result of the inflation of the capsule.

The input terminals 23 are supplied with electrical power, and upon closing of the contacts 15 and 16, a circuit is completed from ground to contacts 15 and 16, to lead 39, connection 38, and contacts 27 to terminal 42 of the relay winding 24, terminal 43 thereof, contacts 31 and hence to the line 44 joining the ungrounded side of the terminals 23. Hence there is a complete circuit from the terminals 23 through the relay winding 24. The latter is energised, and first closes the contacts 28. Thus the terminal 42 of the relay winding now has an alternative path through the connection 37, the closed contacts 28, the lead 36 back to the earthed line 35. In this way a holding circuit is completed to the relay winding 24 so as to make the energisation thereof independent of the continued co-operation of the contacts 15 and 16. The contacts 30 also close thereby completing the circuit across the terminals 56, 58 and effectively producing a signal for ending the first stage and for commencing the second stage of operation of the machine. Following the closing of the contacts 28, the contacts 27 open and the contacts 26 close, whilst the armature 74 is swung in a clockwise direction thereby causing the valve 21 to shut. The opening of the contacts 27 causes the terminal 42 of the winding 24 to be disconnected from the contact 16. The closing of the contacts 26, however, now completes a connection from the contact 16 over the lead 39, the connections 38 and 40, contacts 26, lead 41 to the terminal 45 of the relay winding 25. The other terminal 46 of the relay winding is directly connected to the line 44. Hence if the contacts 15 and 16 remain closed, a circuit would be completed to the relay winding 25 in the same way that a circuit was completed to the relay winding 24. However, by the shutting of the valve 21, the escape through the valve 22 can no longer take place, and there is a rapid rise in pressure in the chamber 13. The capsule 14 immediately responds by a collapse to the extent that the contact 15 no longer co-operates with the contact 16, and thus by the time the contacts 26 are closed no circuit which includes the relay winding 25 is closed. The second stage of operation of the machine now continues, the first stage having been completed and this fact having been indicated by the warning lamp 70 whose control contacts 29 are closed as the result of the energisation of the relay winding 24.

With the finer reduction of the workpiece diameter in the second stage, the gauge 1 continues to respond by bringing the needle valve 4 more slowly towards its orifice 5 thereby gradually increasing the pressure within the capsule 14. Depending upon the adjustment of the escape valve 18, the pressure built up in the capsule 14 will reach a critical value where the contact 15 is once more brought into co-operation with the contact 16. The closing of the contacts 15 and 16 will now complete a circuit as follows: ground, contacts 15 and 16, lead 39, connections 38, 40, contacts 26, lead 41, terminals 45 and 46 of the winding 25 back to the line 44. The relay winding 25 will now be energised. This corresponds to the end of the second stage when the workpiece has reached its finished diameter. This fact is indicated by the warning lamp 72 which is brought into operation by the closing of its contacts 33 upon energisation of the winding 25. The contacts 34 will also be closed and therefore a signal will effectively be made by closing the circuit across the terminals 56, 57, the electromagnet 60A on the machine in circuit with such terminals ensuring that the second stage operation ceases. The contacts 32 also close, and in the position of the switch arm 47 shown in the drawing, a holding circuit is completed for the winding 25 from the earthed lead 35, over the machine push-button switch 55, switch contact 49, switch arm 47, contacts 32 to lead 41 and hence terminal 45 of the winding 25. Simultaneously the contacts 31 open whereby the relay winding 24 is de-energised. When the relay winding 24 becomes de-energised, contacts 26 open thereby isolating the relay winding 25 from control by the contacts 15 and 16. The contacts 30 also open whereby the electromagnet 60B becomes de-energised. Moreover, de-energising of the winding 24 causes opening of the valve 21, thus lowering the pressure in the chamber 13. This is equivalent to increasing the inflation of the capsule 14. The contacts 15, 16 are thereby more forcibly pressed together. The winding 25 continues to be energised because of the hold circuit established over the push-button switch 55.

The finished workpiece W can now be removed from the machine and another new workpiece can be set up for reduction in diameter to the required size. After the new workpiece has been set up, the push-button switch 55 may be actuated, whereupon the holding circuit of the relay winding 25 is broken, and the contacts 32 open to ensure that the relay winding 25 remains de-energised. The control apparatus now resumes the position shown in the drawing and is ready to commence the first stage of operation upon the new workpiece.

In the alternative position of the switch arm 47, it engages the switch contact 48 thereby isolating the push-button switch 55. The holding circuit for the winding 25 is now completed through the lead 39 and the contacts 15 and 16 themselves. When the finished workpiece W is removed under these conditions, the needle valve 4 ensures that the orifice 5 is closed to an extent such that the pressure remains high in the capsule 14, whereby the contacts 15 and 16 remain closed and the relay winding 25 remains energised. Upon the insertion of the new workpiece and upon the corresponding movement of the needle valve 4 away from its orifice 5, the pressure in the capsule 14 will rapidly fall whereby the contact 15 is withdrawn from the contact 16 thereby de-energising the relay winding 25 and restoring automatically the control apparatus to the illustrated position.

To ensure a quick response to a pressure change it is desirable that the pressure responsive element consisting of the capsule 14 should be displaced as little as possible so as to limit the volumetric change. At the same time, it is desirable that the pressure responsive element should be sufficiently flexible to ensure that it will respond to minute pressure changes. The latter condition can be met by making the pressure responsive element sufficiently flexible, but this will allow large movements when large pressure changes occur. By rigidly mounting a rod R within the central supply pipe C connected to the interior of the pressure responsive element, the collapse of the latter can be limited to any desirable degree. Similarly, the cooperating contact 16 mounted in the surrounding chamber 13 may be set as closely as the electrical requirements permit so that the expansion due to inflation is also limited. In this way the electrical contacts 15 and 16 can be closed or opened with the smallest possible volumetric change inside and outside the pressure responsive element, thus permitting the quickest possible response to a change of pressure.

Fig. 2 shows a grinding machine 77 having a grinding head 78. The head 78 drives a grinding wheel 79 that is presented to the work W which latter is pivotally supported by points 80, 81. The head 78 is carried on a slide 82 mounted in guideways 83. The slide 82 is arranged to be moved towards the work W by a hydraulic ram 84 supplied with liquid through series-connected valves 85 and 86. The valve 85 is controlled through a linkage 87 by the electromagnet 60A and has two operative positions, in one of which the flow of the liquid through the valve 85 is restricted and in the other of which the flow is not restricted. The valve 86 is controlled by the electromagnet 60B through a linkage 88 and has two operative positions in one of which the supply liquid is fed from the outlet of the valve 85 to the ram 84 and in the other of which the supply liquid is blanked-off and the ram 84 is connected to an exhaust port 89. A weight 90 on one end of a cable 91 that is passed over a pulley 92 and connected to the slide 82, is provided for withdrawing the slide 82 from the work W. When neither of the electromagnets 60A or 60B is energized liquid passes freely through the valves 85 and 86 to the ram 84 and the slide 82 advances the grinding wheel 79 to the workpiece. When the magnet 60A is energized the valve 85 is operated to restrict the flow of liquid therethrough and the rate of advance of the grinding wheel 79 to the work W is reduced. When the magnet 60B is energized the valve 86 is operated to stop the supply of liquid to the ram 84 and to connect the latter with exhaust so that the slide 82 withdraws the grinding wheel 79 from the work W under the influence of the weight 90.

I claim:

1. An apparatus for controlling the action of a machine tool upon a workpiece, the apparatus comprising an air supply pipe, a pneumatic gauge for gauging the workpiece, the gauge having an orifice the escape area of which is varied in accordance with the dimension of the workpiece being gauged, a first branch leading from the supply pipe to the orifice of the pneumatic gauge, there being, in the first branch, a first constriction between the air supply pipe and said orifice, valve means permitting controlled leakage of air, a second branch leading from the air supply pipe to the valve means, there being in the second branch a second constriction between the supply pipe and the valve means, a pneumatic pressure responsive element, an electrically conductive flexible member included in said pressure-responsive element, a first conduit from one side of the flexible member to that part of the first branch that is between the first constriction and said orifice, a second conduit between the other side of the flexible member and that part of the second branch that is between the second constriction and the valve means, an electric switch device in electrical series with and operable by said flexible member, and means for initiating a control signal to the machine tool when said switch device is operated by said element thereby to vary the action of the machine tool on the workpiece.

2. An apparatus as claimed in claim 1, wherein the pressure-responsive element comprises a closed container, the flexible member being a capsule that is located in the closed container, one of said first and second conduits communicating with the inside of the capsule and the other of these conduits communicating with the container.

3. An apparatus as claimed in claim 2, wherein the switch device comprises a movable contact on the flexible member and a fixed contact that co-operates with the movable contact.

4. An apparatus as claimed in claim 3, and further comprising a stop member for limiting movement of the flexible member in one direction, the movement of the flexible member in the other direction being limited by the fixed contact.

5. An apparatus for controlling a machine tool which treats a workpiece in successive stages, the apparatus comprising an air supply pipe, a pneumatic gauge for gauging the workpiece, the gauge having an orifice the escape area of which is varied in accordance with the dimension of the workpiece being gauged, a first branch leading from the air supply pipe to the orifice of the pneumatic gauge, there being a first constriction in the first branch, a valve means permitting a controlled leakage of air, a second branch between the air supply pipe and the valve means, there being a second constriction in the second branch, a pneumatic pressure responsive element, a flexible member in said element, a first conduit leading from that part of the first branch that is between the first constriction and the orifice to one side of said flexible member, a second conduit leading from that part of the second branch that is between the second constriction and the valve means to the other side of the flexible member, a switch device operable by deflections of said flexible member, a first relay winding, first, second, third and fourth pairs of contacts controlled by the first relay winding, a second relay winding, fifth and sixth pairs of contacts controlled by the second winding, an armature controlled by the first winding and being connected to the valve means thereby to vary the leakage of air, a first electric circuit through the switch device, the first pair of contacts (normally closed), the first winding and the fifth pair of contacts (normally closed) so that the first winding is energised when the switch device is first closed such energisation operating the armature and the first to fourth pairs of contacts, a second circuit through the second pair of contacts (normally open), the first winding and the fifth pair of contacts for holding the first winding in the energised condition, a third circuit through the switch device, the third pair of contacts (normally open) and the second winding, for energising the second winding when the switch device closes for the second time whilst the first winding is maintained energised, a fourth circuit for maintaining the second winding in the energised condition when the first winding becomes de-energised, electrical connections through the fourth pair of contacts for transmitting a first signal to the machine tool whilst the first winding is energised, and connections through the sixth pair of contacts for transmitting a second signal to the machine tool when the second winding is energised.

6. An apparatus as claimed in claim 5 and further comprising a further switch the fourth circuit including a seventh pair of contacts (normally open) operated by the second winding and a two-way switch having two operative positions, in the first of which the fourth circuit is completed through the switch device and in the second of which the fourth circuit is completed through a further switch.

References Cited in the file of this patent
UNITED STATES PATENTS

| | | |
|---|---|---|
| 2,001,447 | Balsiger | May 14, 1935 |
| 2,007,507 | Steiner | July 9, 1935 |
| 2,019,066 | Balsiger | Oct. 29, 1935 |
| 2,023,777 | Balsiger | Dec. 10, 1935 |
| 2,564,527 | Fortier | Aug. 14, 1951 |
| 2,603,043 | Bontemps | July 15, 1952 |